W. E. NICKERSON.
APPARATUS FOR HARDENING AND TEMPERING.
APPLICATION FILED MAY 28, 1904.
991,012.
Patented May 2, 1911.
2 SHEETS—SHEET 2.
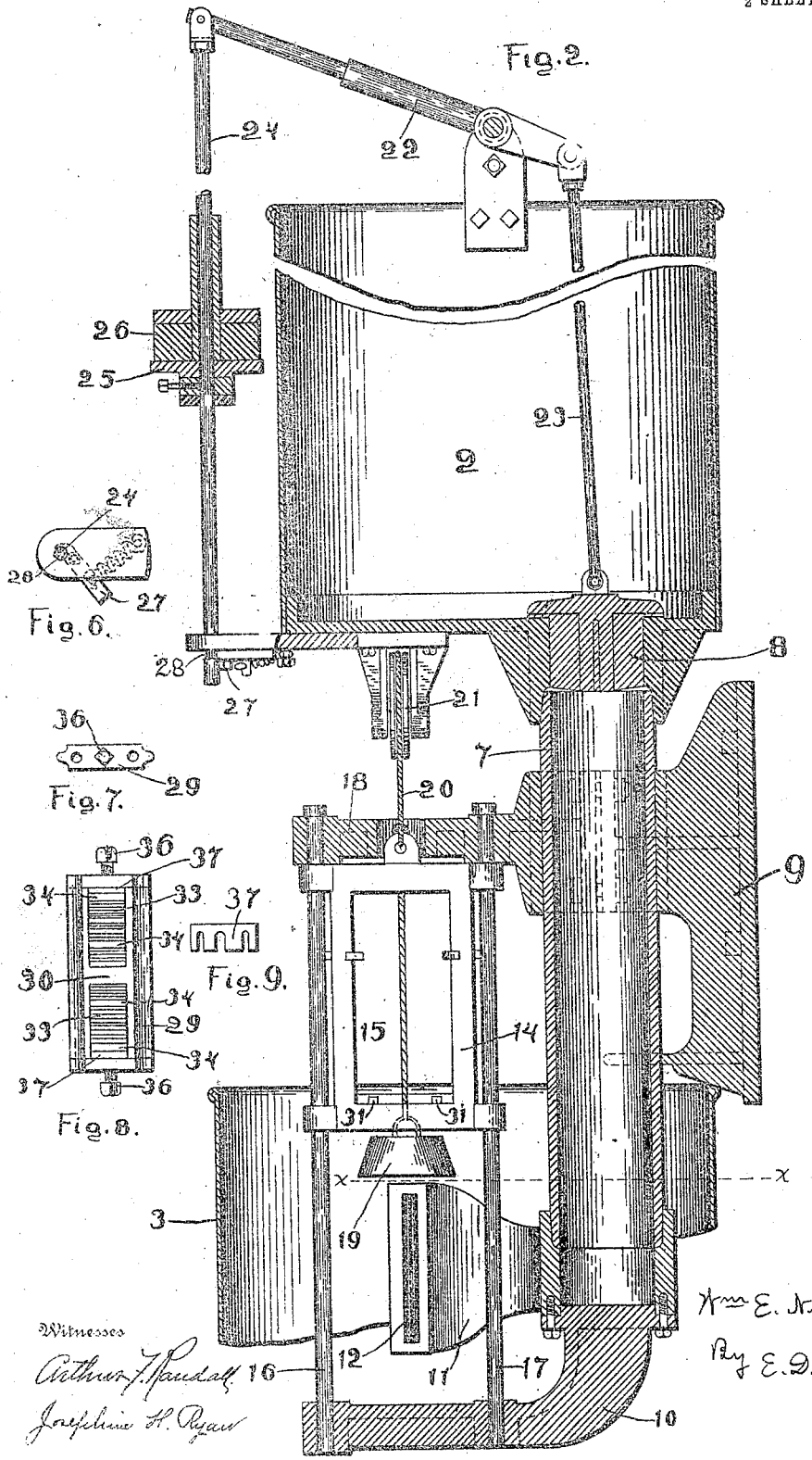
Witnesses
Arthur J. Randall
Josephine H. Ryan
Inventor
Wm E. Nickerson,
By E. D. Chadwick,
Attorney

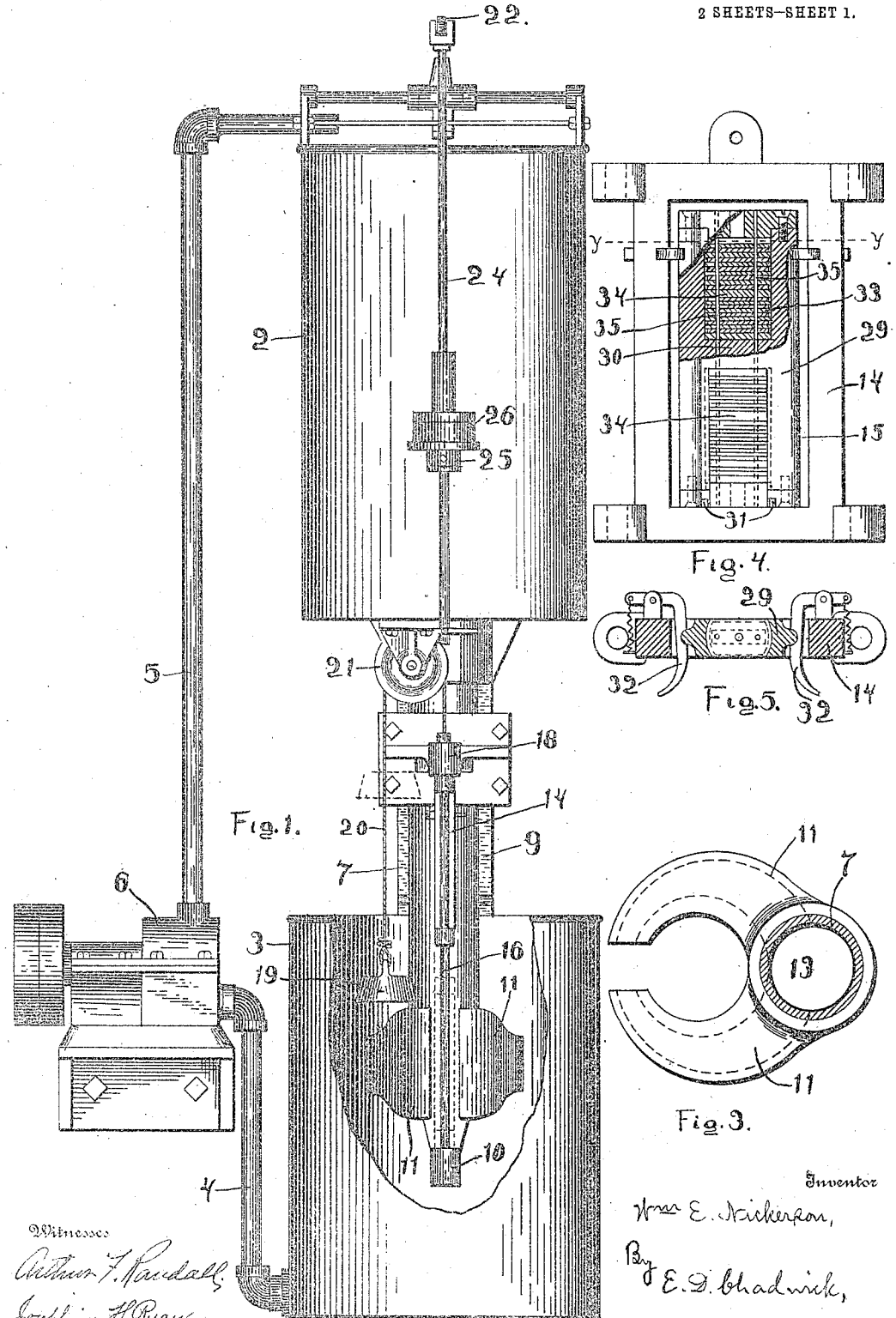

UNITED STATES PATENT OFFICE.

WILLIAM EMERY NICKERSON, OF CAMBRIDGE, MASSACHUSETTS, ASSIGNOR TO GILLETTE SAFETY RAZOR COMPANY, OF BOSTON, MASSACHUSETTS, A CORPORATION OF MAINE.

APPARATUS FOR HARDENING AND TEMPERING.

991,012.  Specification of Letters Patent.  Patented May 2, 1911.

Application filed May 26, 1904. Serial No. 209,967.

*To all whom it may concern:*

Be it known that I, WILLIAM E. NICKERSON, a citizen of the United States, and resident of Cambridge, in the county of Middlesex and State of Massachusetts, have invented new and useful Improvements in Apparatus for Hardening and Tempering, of which the following is a specification.

My invention is intended to provide an apparatus by means of which articles to be hardened may be conveniently and effectively subjected to the powerful chilling action of a current of cold water or the like, after having been properly heated.

The embodiment of my invention herein illustrated and described is particularly adapted for hardening simultaneously a considerable number of thin, flat sheets or leaves of steel, such as blanks for the blades employed in the safety razor shown and described in U. S. Letters Patent No. 775,134 granted on the 15th day of November, 1904, on the application of King C. Gillette.

In carrying out my invention I employ a tank or other source of water supply having or leading to one or more discharge openings, and provided with suitable flow-controlling means for governing the discharge of the chilling medium, and in connection therewith I provide a frame adapted to carry the articles to be hardened and mounted in such manner that said articles may be moved in front of said discharge openings and withdrawn therefrom at will.

My apparatus also includes a holder in which the articles to be tempered may be secured and subjected either to the chilling action or to the action of a tempering bath after being hardened.

My apparatus in its preferred form is illustrated in the accompanying drawings, in which—

Figure 1 is a front elevation of the apparatus, with a portion thereof broken away; Fig. 2 is a central vertical section through the greater portion of the same, viewed at right angles with respect to the position shown in Fig. 1; Fig. 3 is a detail transverse section taken on the line *x—x* in Fig. 2; Fig. 4 is a side elevation and partial section of my frame and holder, showing also a number of blades such as above referred to, secured in the holder. Fig. 5 is a transverse section on the line *y—y* in Fig. 4; Fig. 6 is a detail view illustrating a latch hereinafter described; Fig. 7 is a top plan view; and Fig. 8 is a side elevation of the holder shown in Fig. 4; Fig. 9 is a plan view of a locking wedge hereinafter described.

Referring to the drawings, 2 represents a tank adapted to contain a sufficient quantity of cold water to accomplish the desired chilling action, and 3 represents a second tank located at a lower elevation than the tank 2. Means are preferably provided for pumping water from the lower tank to the upper tank, such as pipes 4 and 5 leading through a pump 6, but it will be understood that any other convenient source of water supply might be substituted for the tank 2. From the lower portion of the tank 2 leads a large pipe 7, the flow through which is controlled by a valve 8, this pipe and the tank from which it leads being shown as supported by a strong bracket 9 which may be bolted to the wall of a room and to which said pipe 7 is clamped. The lower tank 3 is assumed to stand directly upon the floor, and within this tank is located a supporting bracket 10 carrying a pair of laterally-extending hollow heads 11. These heads may be cast in one piece, and the channels 12 provided by their hollow interiors diverge from a central chamber 13 into which leads the lower end of the pipe 7. The channels 12 thus form outlets for the water admitted to said pipe from the tank 2, and terminate at their outer ends in discharge openings which are arranged to face each other with an open space between them and to deliver fluid in fixed vertical paths.

14 represents a carrier frame which forms a distinct, permanent, and coöperating element of the organized machine, having a fixed and determined traverse or path of movement relative to the other instrumentalities, and which is so mounted that it may be lowered into position between the discharge outlets above referred to or raised above the top of the tank, as desired. This frame 14 is represented as rectangular, thus providing a central open portion 15, and is mounted to slide on guiding rods 16 and 17 which extend vertically upward from the support 10 to an arm 18 forming a part of the bracket 9. The said guiding rods form fixed controlling and directing means for the frame 14, so that, as herein shown, it moves in a vertical path parallel and at intervals coincident with the path of fluid discharged from the channels 12. By preference said frame is connected with a weight 19 through the medium of a cord 20 passing over a pulley 21, said weight being sufficient to slightly overbalance the frame when empty.

The valve 8 is provided with suitable operating means such as a lever 22 pivotally supported at the top of the tank 2 and connected at one end with the valve by a rod 23. For actuating this lever I have shown it as provided at its outer end with a depending rod 24 on which a collar 25 is rigidly clamped, which collar carries one or more weights 26 the effect of which is sufficient to lift and open the valve 8 whenever such movement is permitted. For holding the valve closed I provide a spring latch 27 adapted to engage a notch 28 cut in the guided lower portion of the rod 24 when the valve is closed. When this latch is operated to release the rod 24, the weights 26 will fall and open the valve 8, and to close said valve the rod 24 is lifted by hand into the position shown in the drawings.

29 represents a removable holder of any type suitable to the needs of the work for receiving the article or articles to be hardened or tempered, and in the present instance is preferably made of copper and consists of a rectangular rim inclosing two open spaces separated by a transverse partition 30. The holder 29 is independent from the rest of the apparatus, being designed to be placed in the furnace with the articles to be heated therein, and is adapted to be detachably secured in the opening 15 of the frame 14, its lower end being retained therein by lugs 31 and its upper end being retained by spring actuated latches 32 notched to receive the side edges of the holder, as best shown in Fig. 5.

Each of the openings in the holder 29 is of such shape and has such dimensions that it will receive a stack 33 of blades such as hereinbefore referred to and expose the faces of the stack on opposite sides of the holder. These blades are usually provided with three perforations as shown in Fig. 5, and, in practice, when these blades are stacked up for the hardening operation sheets or plates of copper are interleaved between them, as described in my application Serial No. 174,739, filed September 26, 1903, for an improved method of hardening and tempering, the function of these copper plates being to make the sudden change of temperature which results from the chilling action of the cold liquid effective with sufficient quickness over the entire area of the blades, instead of at their edges or rims only. At intervals in this stack I prefer to locate steel plates 34 having considerably greater thickness than the blades, in order to prevent any possibility of curving the blades in the same direction by the clamping action hereinafter described, or otherwise. Said copper plates are provided with perforations adapted to register with the end perforations in the blades, and the complete stack is held in place in the holder 29 by means of steel pins 35 passed endwise through holes drilled in the end portions of said holder, through the perforations in the coppers, blades and plates 34, and into holes drilled through the central transverse partition 30 of the holder, as shown in Fig. 4. It will be understood that these pins remain in place during the hardening operation and are driven out endwise when it is desired to remove the stacks. After the holder has been filled with blades and coöperating parts as shown and described, each stack is compressed by means of a screw bolt 36 adapted to pass through a threaded perforation formed in the end portion of the holder and to bear against one of the plates 34 which is preferably made to form the end plate of the corresponding stack, and while the stacks are under compression, wedges 37, notched to receive the pins 35 and bolts 36 as shown in Fig. 9, are driven into the space opened by the action of the screw bolts 36 between the end plates 34 and the end portions of the holder, whereupon the screw bolts 36 are removed.

The discharge openings at the outer ends of the channels 12 are given a length corresponding to that of the exposed faces of the stacks in the holder 29, and the downward movement of the frame 14 is so limited that when in its lowermost position, said exposed faces will be directly opposite said discharge openings respectively. These openings are of such width as will deliver a sufficient volume of water to act simultaneously upon all portions of the holder and contained stacks, or practically so.

In using my apparatus, as thus constructed, the holder 29 is filled with blades, coppers and plates 34 as above described and the entire holder and its contents are then heated, preferably out of contact with air or in a reducing atmosphere, to a suitable temperature to produce the desired degree of hardness. This may be done by burying the holder and its contents in a quantity of carbonaceous material contained in a muffle and then heating the muffle. Assuming the tank 2 to be filled with water, the heated holder is then immediately placed in the movable frame 14 as shown in Fig. 5, whereupon the combined weight of the frame and the holder with its contents will overbalance the counterweight 19 and cause said frame and holder to descend into the lowermost position of the frame, thus bringing the hot stacks between and directly opposite the discharge openings above referred to. The latch 27 is then immediately operated to release the rod 24, thus causing the valve 8 to open, whereupon the water in the tank 2 rushes down through the pipe 7 and out through the channels 12, from which it is forcibly projected directly against the holder 29 and its contents and instantly chills the latter. After the water contained in the tank 2 has been discharged through the channels 12 as above described, the frame 14 is raised to the position shown in Fig. 2, the holder 29 is removed therefrom, the screw bolts 36 are turned in sufficiently to enable the wedges 37 to be withdrawn, the pins 35 are driven out of the stacks, and the blades and coppers are then removed and separated.

The holder 29 may be made use of in drawing the temper of the blades, if desired, in which case the hardened blades may be stacked up without coppers between them and secured in the holder as above described, which holder with its contents is then immersed in a suitable tempering bath as described in my pending application, No. 174,739, above referred to. When used for this purpose the holder is preferably made of iron or steel rather than of copper.

The method of hardening and tempering involved in the stacking up of the blades as above described is not claimed herein, being claimed in my aforesaid pending application, No. 174,739, and while my apparatus is particularly intended for use in the practicing of said method, yet it is not limited to such use nor to the particular construction herein shown and described.

I claim as my invention:

1. In an apparatus of the character described, the combination of a tank, a fluid supply pipe provided with a discharge opening delivering in a fixed path, means for controlling a flow of fluid through said opening, a support to receive the work, and guiding means for securing a relative movement of said work support and said supply pipe in paths which coincide at certain intervals in their travel.

2. In an apparatus of the character described, the combination of a tank, a fluid supply pipe provided with a discharge opening delivering in a fixed path and located in said tank, means for controlling a flow of liquid through said opening, a movable support to receive the work after the latter has been heated, and guiding means to positively direct the work in a path coincident at intervals with the path of the fluid discharged.

3. In an apparatus of the character described, the combination of a tank, a fluid supply pipe provided with a discharge opening delivering in a fixed path and located in said tank, means for controlling a flow of fluid through said opening, a movable carrier frame adapted to detachably receive the work after the latter has been heated, and fixed guides on which said frame is mounted for controlling and directing said frame in a path coincident at intervals with the path of fluid discharged.

4. In an apparatus of the character described, the combination of a supply tank and a receiving tank, a discharge pipe leading from the former and delivering in a fixed path within the latter, means for controlling a flow of fluid through the same, a movable carrier frame adapted to detachably receive the work after the latter has been heated, and fixed guides on which said frame is mounted for controlling and directing it in a path coincident at intervals with the path of fluid discharged.

5. In an apparatus of the character described, the combination of a tank and a fluid supply pipe leading into the same and provided with a discharge opening within the tank which delivers in a fixed and vertical path, means for controlling a flow of fluid through said opening, a movable carrier frame adapted to detachably receive the work after the latter has been heated, and fixed guides on which said frame is mounted for controlling and directing it in a vertical path coincident at intervals with the vertical path of fluid delivery.

6. In an apparatus of the character described, the combination of a tank and a fluid supply pipe leading into the same and provided with a pair of opposed discharge openings located within the tank and discharging it in fixed paths, means for controlling a flow of fluid through said openings, a movable carrier frame adapted to detachably receive the work after the latter has been heated, and fixed guides on which said frame is mounted to control and direct it in a fixed path coincident at intervals with the path of fluid delivery.

7. In an apparatus of the character described, the combination of two tanks located one above the other, a pipe leading from the upper tank to the lower tank and provided within the latter tank with one or more discharge openings, a valve normally closing said pipe, means tending to open said valve, a latch for holding said valve in its closed position, and a frame movable into and out of position in front of said discharge openings.

8. In an apparatus of the character described, the combination of a tank, vertical guides located therein, a frame mounted to slide on said guides, a counterweight connected to said frame and overbalancing the same when empty, and a holder adapted to be received and detachably retained by said frame, the weight of the frame and holder with its contents being sufficient to overbalance said counterweight.

9. In an apparatus of the character described, the combination of a tank, a supply pipe leading into the same and provided within the tank with opposed discharge openings delivering in fixed vertical paths, means for regulating the flow of fluid through said openings, vertical guides located in said tank, a carrier frame mounted to slide on said guides in a path parallel and at intervals coincident with said fluid delivery paths into and out of position between said discharge openings, and adapted to detachably receive the work after the latter has been heated, and means for operating said frame.

10. In an apparatus of the character described, the combination of a fluid supply pipe provided with channeled heads having opposed discharge openings which deliver fluid in fixed paths, means for controlling the flow of fluid through said openings, a carrier frame movable into and out of position between said openings, a holder independent of said carrier and formed to expose the opposite faces of its contents, and means for detachably securing said holder to said frame.

11. In an apparatus of the character described, the combination of a fluid supply pipe provided with channeled heads having opposed discharge openings which deliver fluid in fixed paths, means for controlling the flow of fluid through said openings, a holder adapted to receive articles to be hardened and to expose the opposite faces thereof, and a carrier frame adapted to detachably receive said holder and its contents after the same have been heated and guided to move the same into and out of position between said discharge openings.

12. In an apparatus of the character described, the combination of two tanks one located above another, a pipe leading from the upper tank to the lower tank and terminating within the latter in two opposed discharge openings which deliver fluid in fixed paths, means for controlling the delivery of fluid from the upper tank through said openings, a holder adapted to receive articles to be hardened and a carrier frame adapted to detachably receive said holder and its contents after the same have been heated and guided to move the same into and out of position between said discharge openings.

13. In an apparatus of the character described, the combination with an independent and separable holder adapted to receive articles to be heated, a movable carrier frame and means for detachably securing said holder to the frame after the holder and its contents have been heated, of means for subjecting the articles contained in said holder to the action of a chilling fluid.

14. In an apparatus of the character described, the combination with a frame, a holder adapted to enter the same and formed to expose articles contained therein on opposite sides of the frame, and means for detachably securing the holder in said frame after the holder and its contents have been heated, of means for subjecting the holder and its contents to the action of a chilling fluid.

15. In an apparatus of the character described, the combination with a tank and means for supplying fluid thereto, of a carrier frame adapted to be lowered into said tank, a holder 29, and catches for detachably connecting said holder and frame.

16. In an apparatus of the character described, the combination of a fluid supply pipe provided with two opposed discharge openings, means for controlling a flow of fluid through said openings, a holder adapted to receive a stack of thin sheet metal articles superimposed one upon another and to expose the collective edges thereof on opposite sides of said holder, and a carrier frame provided with means for detachably connecting said holder thereto, said frame being mounted to move the holder and its contents into and out of position between said discharge openings.

17. In an apparatus of the class described and in combination, a holder adapted to receive the articles to be treated, a support to which said holder and the articles therein are detachably secured, a fluid discharge head, means for securing a relative movement between said support and holder and said head, and guiding means to effect coincidence in the paths of movement of said relatively movable parts at intervals.

18. In an apparatus of the character described and in combination, a frame, a holder carried thereby and formed to expose the edges of articles contained therein, means for detachably securing said holder to said frame after the holder and its contents have been heated, and means for subjecting the holder and its contents to the action of a chilling fluid.

19. In an apparatus of the character described and in combination, a fluid discharge head adapted to deliver fluid in a fixed path, a frame, a holder carried thereby and formed to expose the edges of articles contained in said holder, and guides for the frame to cause it to traverse a path coincident with the path of fluid delivery from said discharge head.

20. In an apparatus of the character described, and in combination, a frame, a holder adapted to be carried thereby and formed to receive a stack of thin sheet metal articles and expose the collective edges of the same at one side of the holder, and means for discharging a fluid upon the holder and the exposed edges of its contents after the same have been heated and placed in the frame.

21. In an apparatus of the character described, and in combination, a holder formed to receive a stack of thin sheet metal articles so as to expose the collective edges of the same at one side of the holder, and means for discharging a fluid upon the holder and the exposed edges of its contents.

In testimony whereof, I have hereunto subscribed my name this ninth day of May, 1904.

WILLIAM EMERY NICKERSON.

Witnesses:
E. D. CHADWICK,
ANNA W. CORBETT.